(12) United States Patent
Matsushima

(10) Patent No.: US 6,480,678 B1
(45) Date of Patent: Nov. 12, 2002

(54) LIGHT TRANSMITTING MEMBER DRIVING DEVICE FOR A CONTOUR MEASURING APPARATUS

(75) Inventor: Takaaki Matsushima, Tokyo (JP)

(73) Assignee: NEC Engineering, Ltd., Tokyo (JP)

(*) Notice: Subject to any disclaimer, the term of this patent is extended or adjusted under 35 U.S.C. 154(b) by 0 days.

(21) Appl. No.: 09/941,715

(22) Filed: Aug. 30, 2001

(51) Int. Cl.$^7$ .................. G03B 15/03; G03B 21/00; G01B 11/25; H04N 7/18

(52) U.S. Cl. .................. 396/155; 348/136; 353/40; 356/610

(58) Field of Search .................. 396/155; 348/136; 362/18, 16; 356/603, 610; 353/40

(56) References Cited

U.S. PATENT DOCUMENTS 4,185,918 A * 1/1980 DiMatteo et al. .......... 356/610

* cited by examiner

Primary Examiner—W. B. Perkey
(74) Attorney, Agent, or Firm—Young & Thompson

(57) ABSTRACT

A three-dimensional measuring apparatus or similar contour measuring apparatus of the present invention includes a projector for emitting light, a lattice film or similar light transmitting member, and a camera. Light issuing from the projector is transmitted through the lattice film to illuminate an object to be measured. The lattice film is movable to a plurality of projecting positions in a preselected direction. The camera shoots the object being illuminated by the light. A driving device for driving the lattice film includes a cam follower associated with the lattice film, and a cam for guiding the cam follower. The cam has a cam surface including a plurality of contiguous, insensitive portions each for causing the lattice film to remain in a halt at a particular position when the cam follower contacts the insensitive portion.

8 Claims, 12 Drawing Sheets

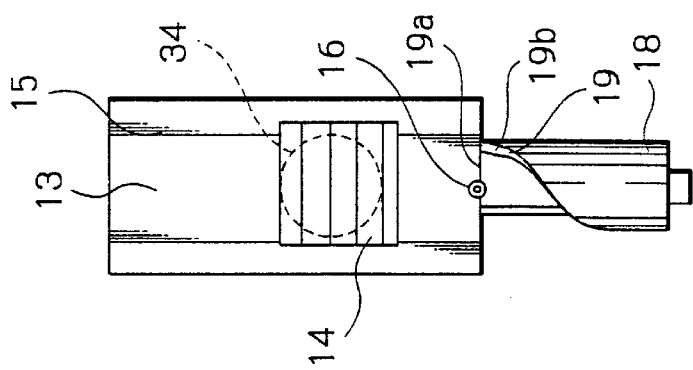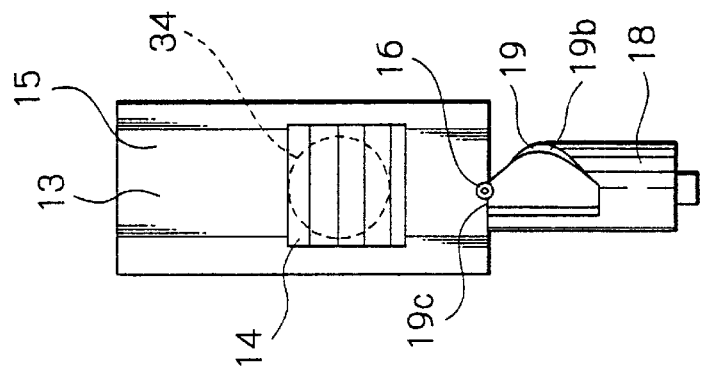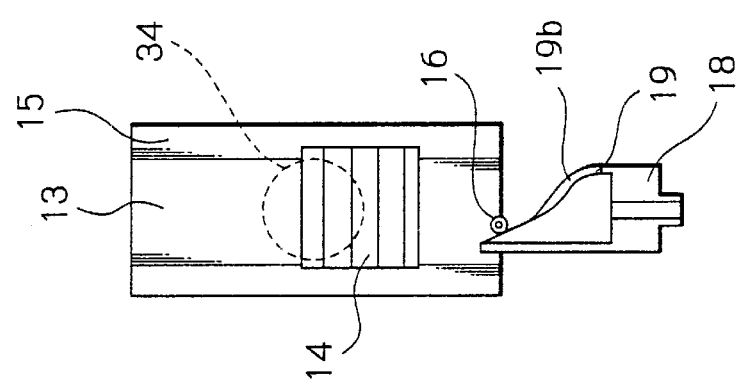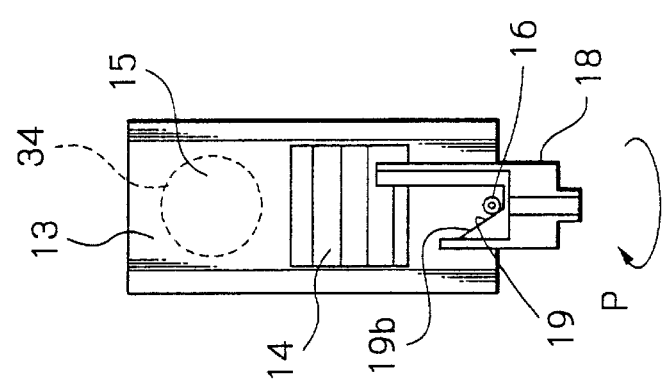

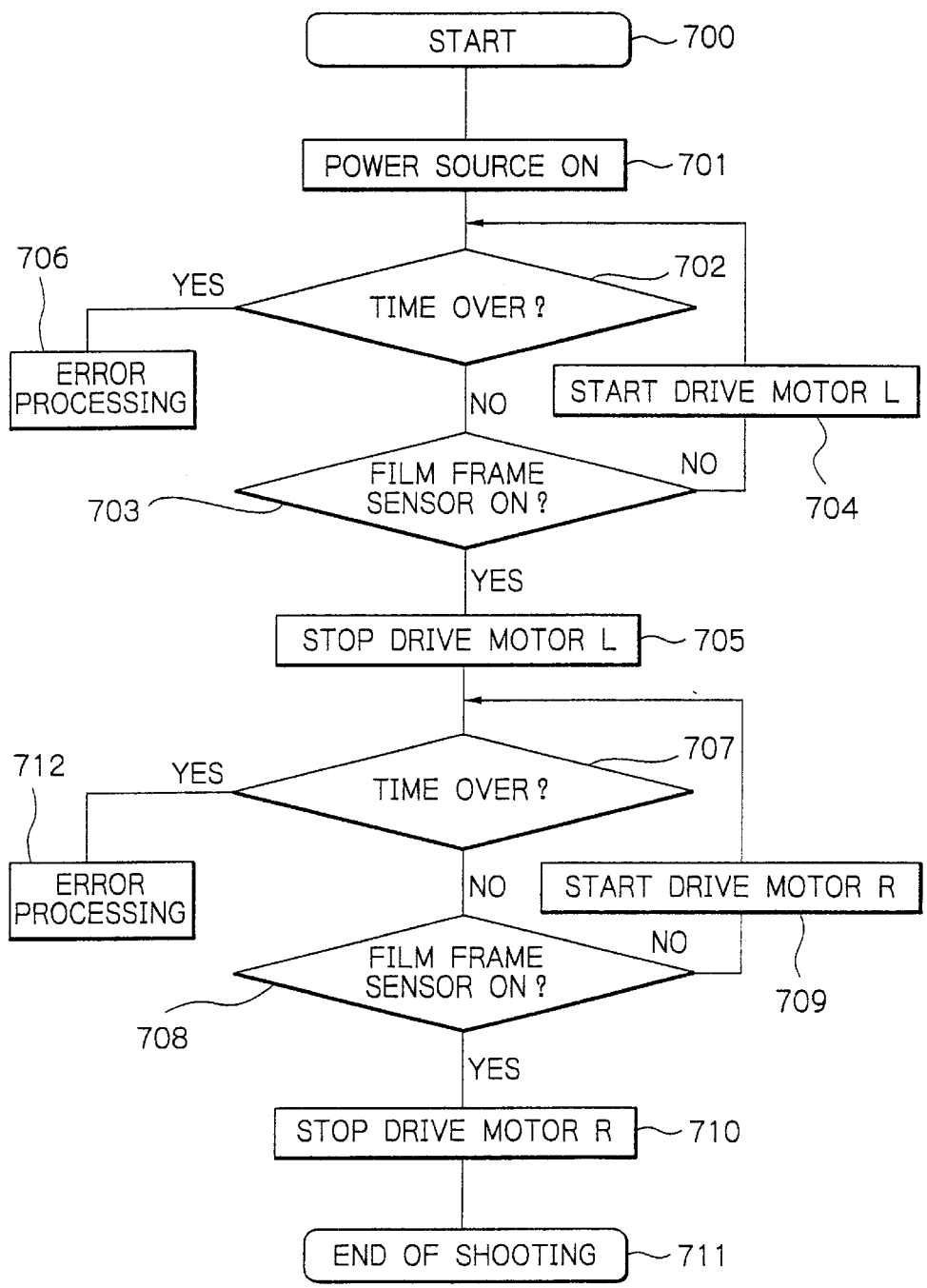

LIGHT TRANSMITTING MEMBER DRIVING DEVICE FOR A CONTOUR MEASURING APPARATUS

BACKGROUND OF THE INVENTION

1. Field of the Invention

The present invention relates to a contour measuring apparatus, e.g., a three-dimensional measuring apparatus for outputting three-dimensional data representative of an object by a sinusoidal phase lattice method. More particularly, the present invention relates to a device for driving a lattice film included in the three-dimensional measuring apparatus or similar light transmitting member that transmits light issuing from a light source in order to project a stripe pattern on the surface of an object.

2. Description of the Background Art

A sinusoidal phase lattice method is applicable to a three-dimensional measuring apparatus for accurately obtaining three-dimensional data representative of a desired object. Specifically, the method illuminates an object such that a stripe pattern is projected on the object and causes a camera to shoot the object. The stripe pattern is sequentially moved in, e.g., the vertical direction, so that the camera shoots the object at a plurality of points, e.g., four points. Subsequently, another camera shoots the same object at four points, but in a different direction. The resulting image data output at eight points in total are processed to produce three-dimensional data relating to the object.

A conventional three-dimensional measuring apparatus includes two camera and projector assemblies spaced from each other by a suitable distance. Each camera and projector assembly has an optical axis directed toward the center. An object to be measured is positioned at the center between the camera and projector assemblies. The projectors each include a lattice film or light transmitting member for projecting a stripe pattern on the object, a driving device for moving the lattice film in order to shift the position where the stripe pattern is projected on the object, and a shutter for screening the stripe pattern output from the lattice film.

A prerequisite with the conventional measuring apparatus described above is that each projector projects an accurate stripe pattern on the surface of the object for accurate measurement. Another prerequisite is that the lattice film and therefore the stripe pattern be accurately moved at preselected intervals. However, the conventional measuring apparatus, particularly the driving device included therein, is sophisticated in configuration and needs a number of parts, which increase the cost. Moreover, the accuracy of displacement of the lattice film available with the driving device is short.

SUMMARY OF THE INVENTION

It is an object of the present invention to provide a driving device included in a three-dimensional measuring apparatus or similar contour measuring apparatus and capable of moving a lattice film or similar light transmitting member accurately to a preselected position.

It is another object of the present invention to provide a simple, low-cost driving device for driving a light transmitting member included in a three-dimensional measuring apparatus or similar contour measuring apparatus.

A three-dimensional measuring apparatus or similar contour measuring apparatus of the present invention includes a projector for emitting light, a lattice film or similar light transmitting member, and a camera. Light issuing from the projector is transmitted through the lattice film to illuminate an object to be measured. The lattice film is movable to a plurality of projecting positions in a preselected direction. The camera shoots the object being illuminated by the light. A driving device for driving the lattice film includes a cam follower associated with the lattice film, and a cam for guiding the cam follower. The cam has a cam surface including a plurality of contiguous, insensitive portions each for causing the lattice film to remain in a halt at a particular position when the cam follower contacts the insensitive portion.

BRIEF DESCRIPTION OF THE DRAWINGS

The above and other objects, features and advantages of the present invention will become more apparent from the following detailed description taken with the accompanying drawings in which:

FIGS. 9A through 9D demonstrate how a film frame included in the illustrative embodiment sequentially rises in accordance with the rotation of the cam;

FIG. 10 is a flowchart demonstrating a sequence of initializing steps executed by the control system;

DESCRIPTION OF THE PREFERRED EMBODIMENT

Figure 1:
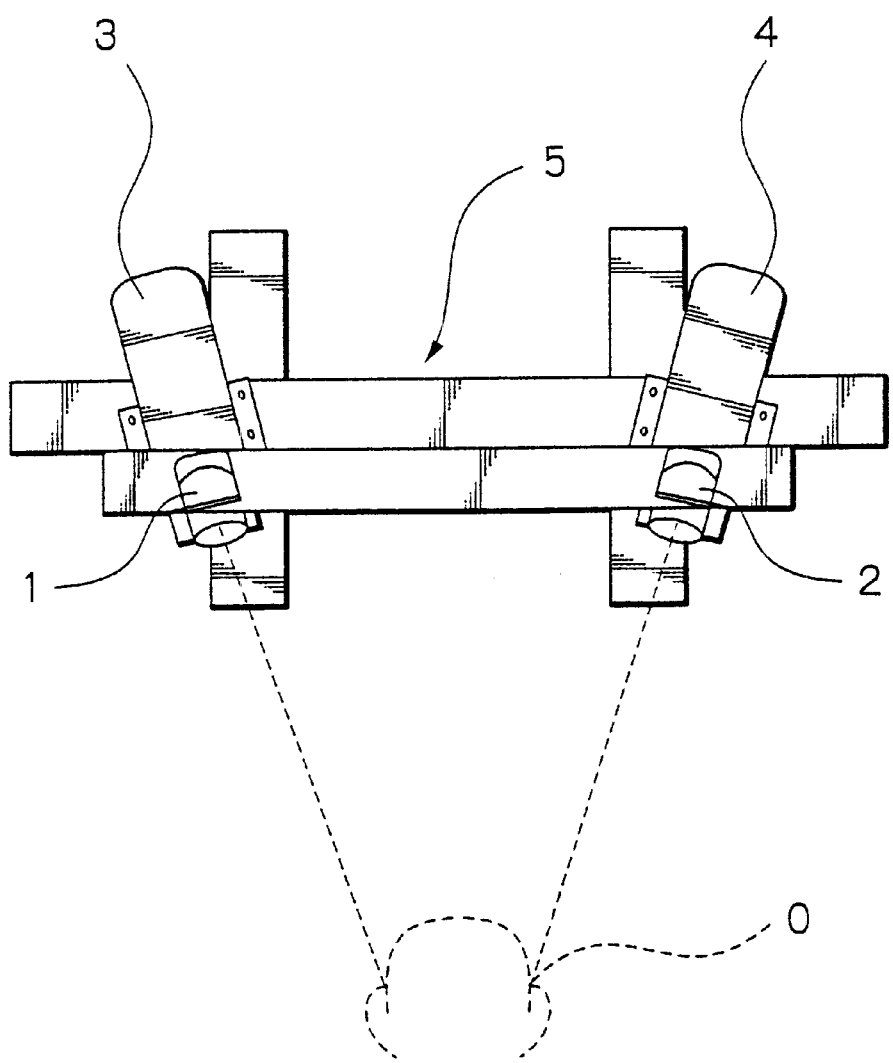
FIG. 1 is a plan view showing a conventional contour measuring apparatus implemented as a three-dimensional measuring apparatus.
Figure 3:
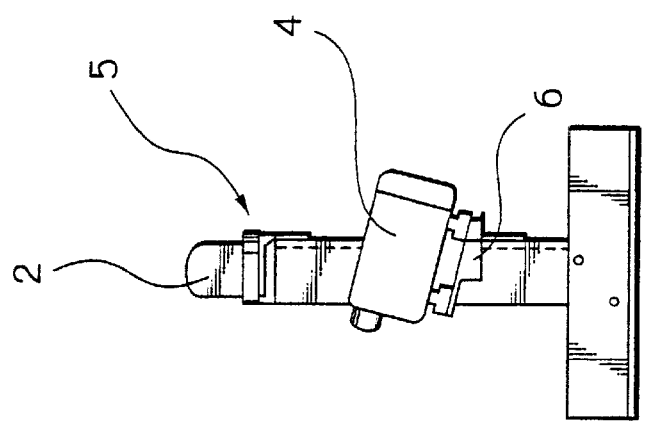
FIG. 3 is a side elevation of the conventional measuring apparatus as seen from the right.
Figure 2:
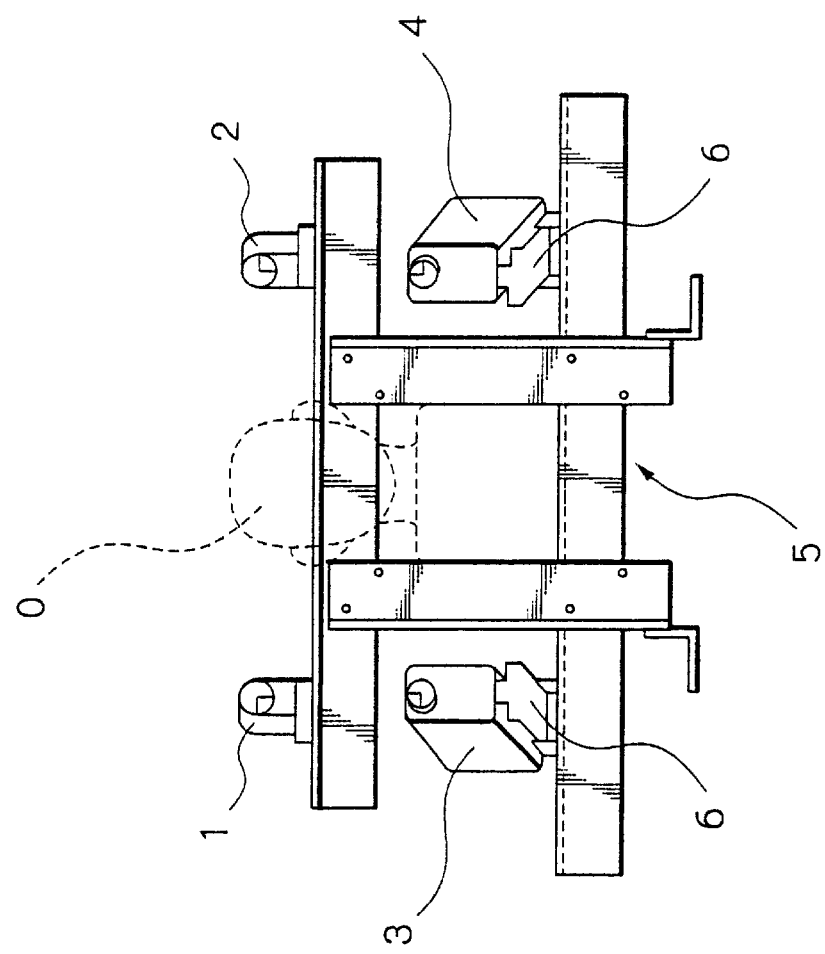
FIG. 2 is a front view of the conventional measuring apparatus.

To better understand the present invention, brief reference will be made to a conventional, three-dimensional measuring apparatus, shown in FIGS. 1 through 3. As shown, the measuring apparatus includes two cameras 1 and 2 and two projectors 3 and 4. The camera 1 and projector 3 and the camera 2 and projector 4 each are assembled together. The two camera and projector assemblies are mounted on a frame 5 and spaced from each other by a suitable distance. Each camera and projector assembly has an optical axis directed toward the center. An object 0 is positioned at the center between the camera and projector assemblies. The projectors 3 and 4 each are mounted on the frame 5 via a respective bracket 6.

Figure 4:
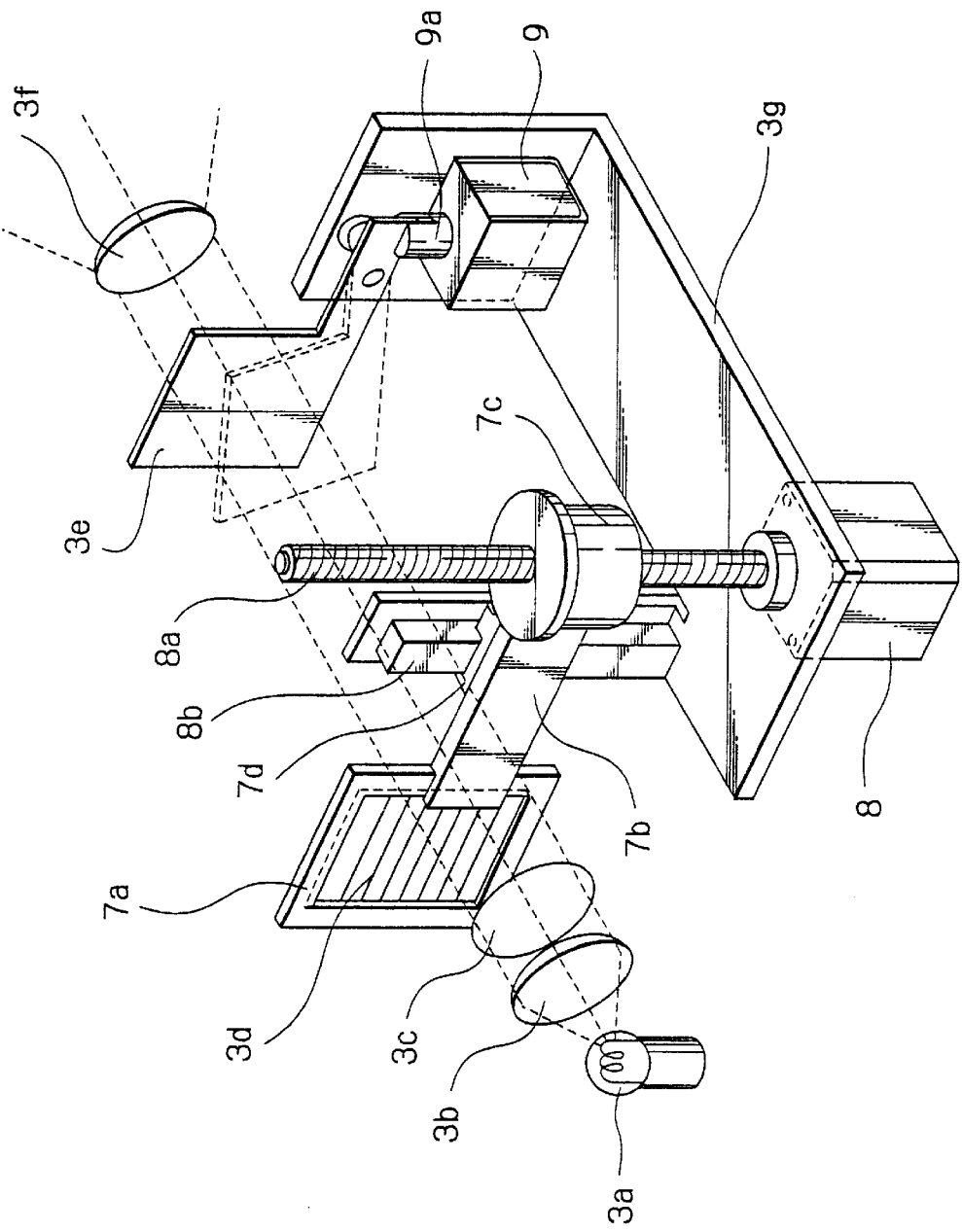
FIG. 4 is a perspective view showing a projector included in the conventional measuring apparatus.

FIG. 4 shows a lattice film drive mechanism included in each of the projectors 3 and 4, which are identical in configuration. Let the following description concentrate on the projector 3 by way of example. As shown, the projector 3 includes a light source 3a and lenses for adjustment 3b and 3c positioned in front of the light source 3a. Light issuing from the light source 3a is transmitted through the lenses 3b and 3c to be shaped into parallel rays thereby. A lattice film 3d is located in front of the lens 3c. The parallel rays output from the lens 3c are transmitted through the lattice film 3d to be thereby converted to light that projects a stripe pattern. A shutter 3e is positioned in front of the lattice film 3d while a diffusing lens 3f is positioned in front of the shutter 3e.

A film frame 7a supports the lattice film 3d and is supported by one end of an arm 7b. The other end of the arm 7b is affixed to a bracket 7c formed with a through bore. A female screw, not shown, is formed in the wall of the through bore. A guide member 7d is mounted on the arm 7b at the intermediate between opposite ends of the arm 7b and is formed with a guide groove. A projector base 3g is disposed in the projector 3 while a drive motor 8 is mounted on the lower surface of the projector base 3b. A drive shaft 8a is connected to the output shaft of the drive motor 8 and implemented as a ball screw. The drive shaft 8a protrudes from the upper surface of the projector base 3g upward. The bracket 7c is held in threaded engagement with the drive shaft 8a. A guide rail 8b extends from the projector base 3g upward and is received in the guide groove of the guide member 7d in order to guide the guide member 7d.

A shutter solenoid 9 is mounted on the upper surface of the projector base 3g and includes a plunger 9a. The shutter 3e is connected to the plunger 9a and actuated thereby to selectively block or unblock the optical path of the diffusing lens 3f.

The measuring apparatus with the lattice film drive mechanism described above outputs three-dimensional data relating to the object 0, as will be described hereinafter. First, one of the cameras 1 and 2 obtains data relating to the object 0. Specifically, the shutter solenoid 9 included in, e.g., the projector 3 initially positions the shutter 3e on the optical path of the diffusing lens 3f. In this condition, the light source 3a of the projector 3 and the light source 4a, not shown, of the projector 4 both are caused to emit light. The shutter solenoid 9 of the projector 3 then moves the shutter 3e out of the optical path to thereby unblock the optical path. Consequently, the light issuing from the light source 3a is incident to the object 0 via the lattice film 3d, projecting a stripe pattern on the surface of the object 0.

Subsequently, to move the stripe pattern to a preselected position, the drive motor 8 is energized to rotate the drive shaft 8a. The drive shaft 8a, in turn, causes the bracket 7c to move upward or downward in accordance with the direction of rotation of the shaft 8a, shifting the lattice film 3d in the vertical direction. As soon as the lattice film 3d reaches the preselected position, the drive motor 8 is deenergized. In this condition, the camera 1 shoots the object 0 on which the stripe pattern is projected. The drive motor 8 is again energized to move the lattice film 3d to another preselected position in the vertical direction. At this position, the camera 1 again shoots the object 0 on which the stripe pattern is projected. Such operation is repeated to cause the camera 1 to shoot the object 0 at four different positions.

After the camera 1 has shot the object 0 at four positions, the shutter solenoid 9 again causes the shutter 3e block the optical path of the diffusing lens 3f. Thereafter, the camera 2 shoots the object 0, on which the projector 4 projects a stripe pattern, at four different positions in the same manner as the camera 1. As a result, the cameras 1 and 2 output data relating to the object 0 at eight different positions in total. These data are subjected to suitable operation for producing the three-dimensional data of the object 0.

A prerequisite with the conventional measuring apparatus described above is that each projector projects an accurate stripe pattern on the surface of the object 0 for accurate measurement. Another prerequisite is that the lattice film and therefore the stripe pattern be accurately moved at preselected intervals. The measuring apparatus is therefore apt to bring about the following problems.

For the accurate projection of the stripe pattern, it is necessary to screen, e.g., the light source 4a of the projector 4 combined with the camera 2, which is not expected to shoot the object 0 first. For this purpose, the measuring apparatus uses a shutter. Generally, a certain period of time is necessary for the quantity of light issuing from a light source to become stable after the turn-on of the light source. Therefore, if the light source 4a, for example, not necessary at first is not turned on beforehand, then the measuring time is extended to obstruct rapid measurement. This is why the light source 4a is turned on beforehand and screened by the shutter. The shutter, however, must be drive by an exclusive drive mechanism including the shutter solenoid 9, resulting in an increase in the number of parts and a sophisticated structure.

To move the stripe pattern at preselected intervals on the object 0, the lattice film 3d must be moved with utmost accuracy. The drive motor 8 and drive shaft 8a are respectively implemented by a stepping motor or similar precision motor and a ball screw, so that smooth movement of the bracket 7c and substantially accurate intervals of movement are achievable. However, a stepping motor and a ball screw are expensive and increase the cost of the projector and therefore the cost of the entire measuring apparatus. Further, the number of pulses available with a stepping motor and the lead of a ball screw are limited. This is likely to introduce an error in the stop position of the lattice film 3d even when the lattice film 3d is driven by the same number of pulses. Moreover, vibration ascribable to the turn-on and turn-off of the drive motor 8 is apt to make the stop position of the bracket 7c relative to the ball screw 8a irregular to an unignorable degree.

To move and stop the lattice film 3d, the drive motor 8 must be turned on and turned off and must be decelerated before stopping the lattice film 3d at a preselected position. The deceleration to a stop needs a certain period of time even though the distance of movement may be short. This period of time cannot be reduced beyond a certain limit and obstructs high-speed measuring operation.

A device for driving a light transmitting member, which is included in a contour measuring apparatus, embodying the present invention will be described hereinafter. In the illustrative embodiment, the contour measuring apparatus and light transmitting member are also implemented as a three-dimensional measuring apparatus and a lattice film, respectively. The three-dimensional measuring apparatus, like the conventional apparatus shown in FIGS. 1 through 4, includes two camera and projector assemblies each for projecting a stripe pattern on the object 0 and shooting it. The cameras have the configuration described with reference to FIGS. 1 through 4 and are also designated by the reference numerals 1 and 2.

Figure 5:
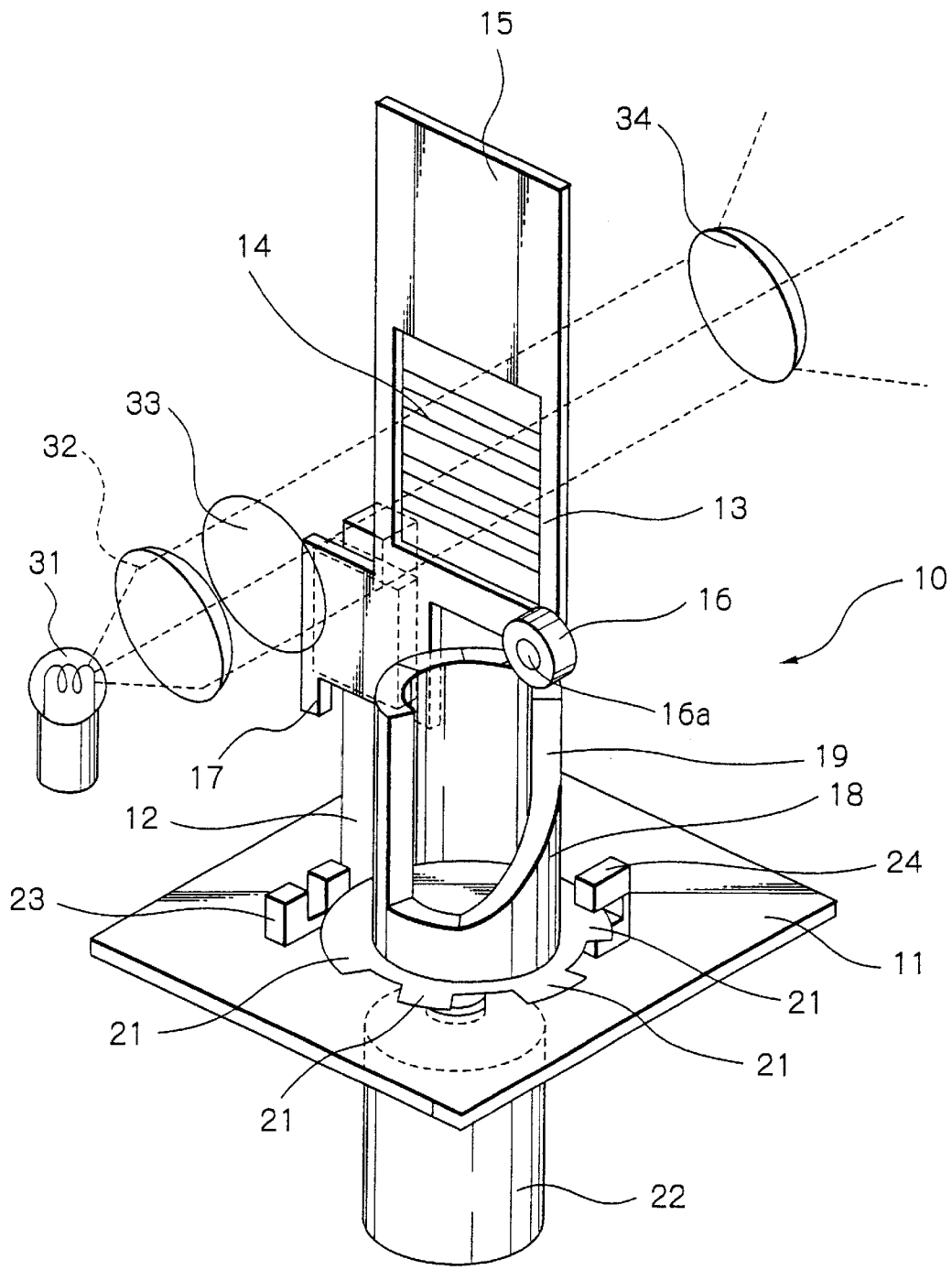
FIG. 5 is an isometric view showing a driving device embodying the present invention and applied to a three-dimensional measuring apparatus in a condition wherein a lattice film or light transmitting member is positioned on an optical path.
Figure 6:
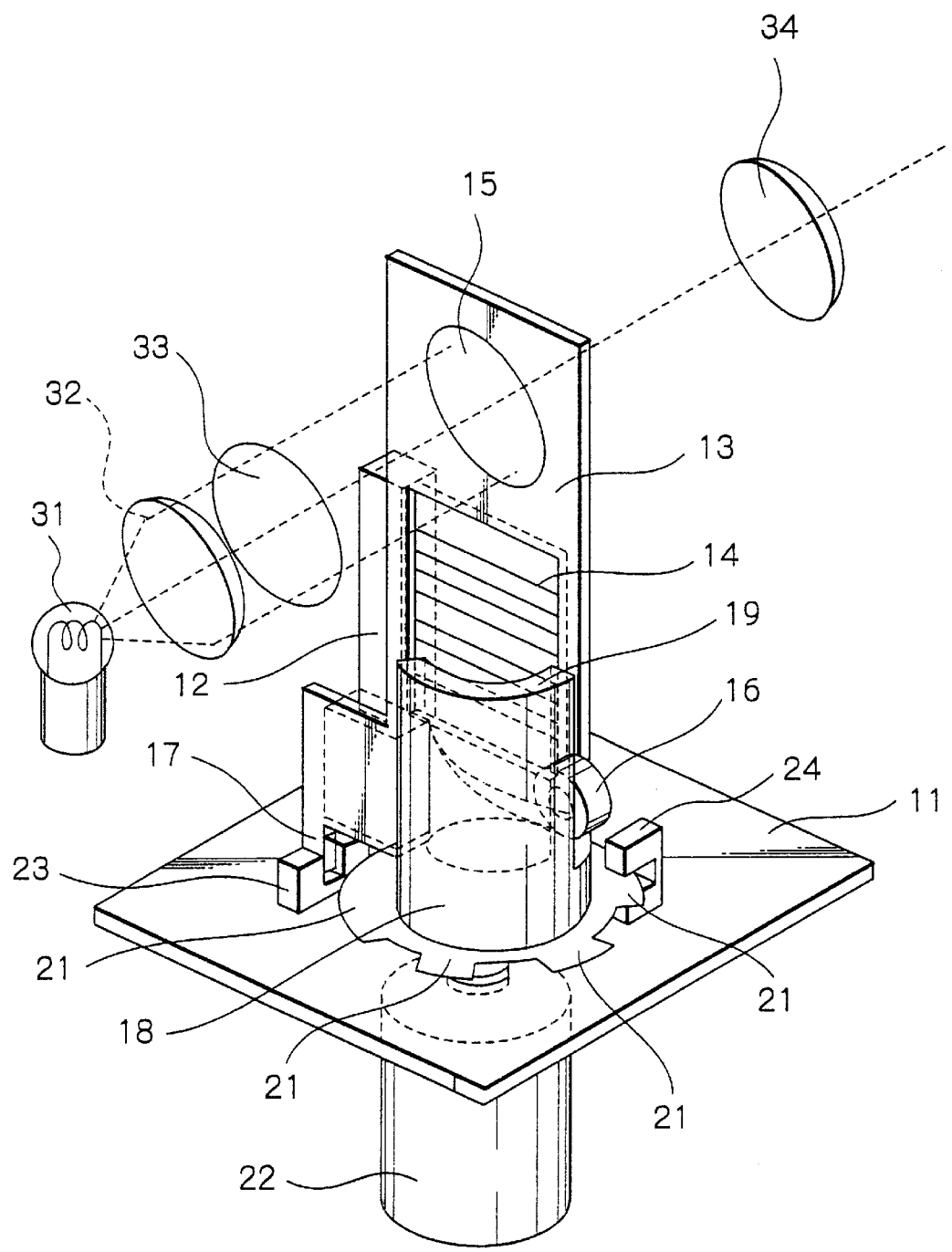
FIG. 6 is a view similar to FIG. 5, showing the driving device in another condition wherein a screen is positioned on the optical path.
Figure 7:
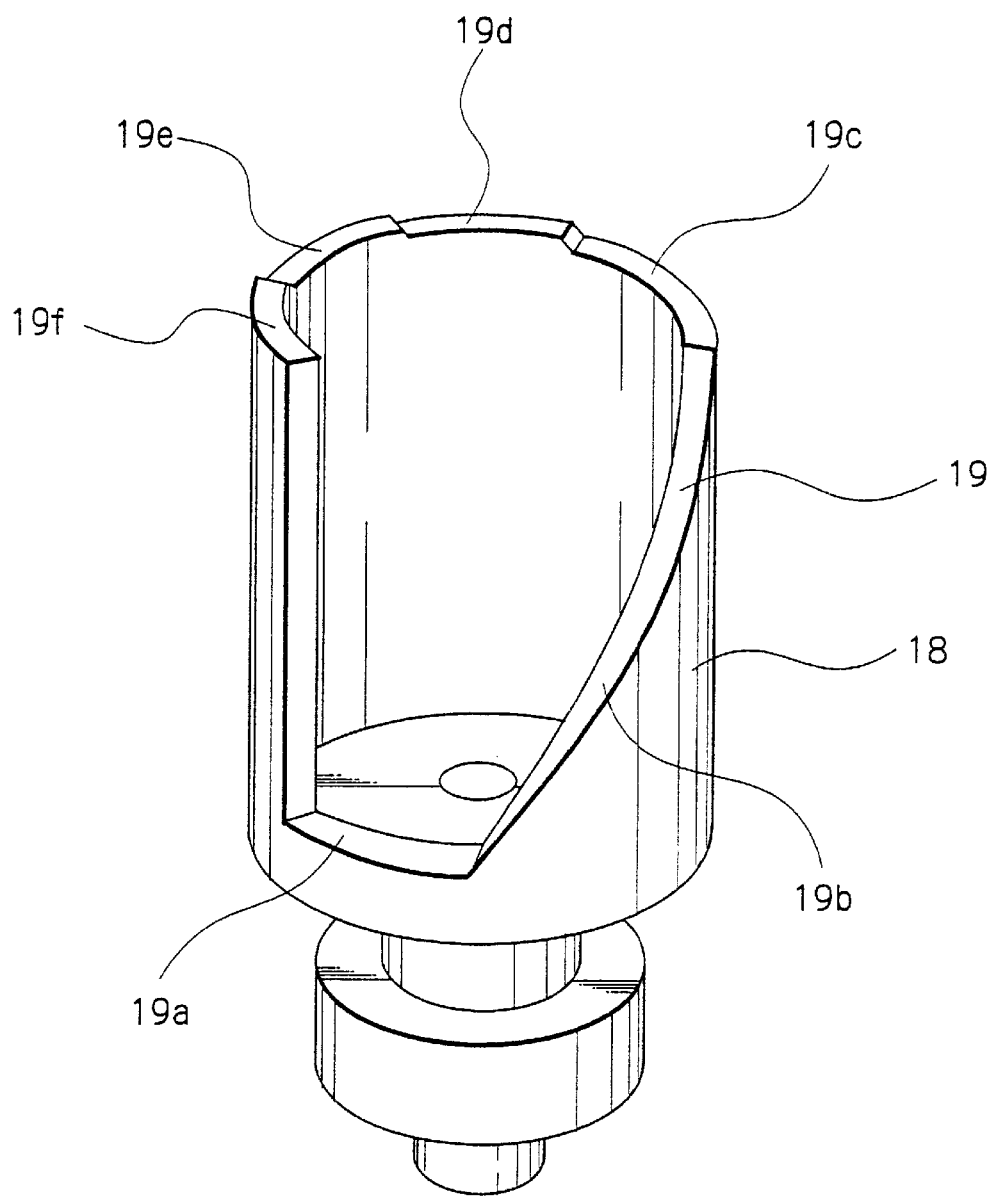
FIG. 7 is an isometric view showing the configuration of a cam included in the illustrative embodiment.

FIGS. 5 through 7 show a projector 10 unique to the illustrative embodiment. As shown, the projector 10 accommodates a projector base 11 therein. An upright guide rode 12 extends vertically from the upper surface of the projector base 11. The guide rod 12 allows a film frame 13 to move up and down therealong. The film frame 13 supports a lattice film 14 with its lower half portion such that light transmitted through the lattice film 13 projects a stripe pattern. The upper half portion of the film frame 13 constitutes a screen or screen portion 15. When the screen 15 enters an optical path, which will be described specifically later, the former blocks the latter. A horizontal stub 16a is studded on a lower portion of the film frame 13 adjoining one side of the film frame 13. A roller or cam follower means, 16 is mounted on the stub 16b via a bearing, not shown, so as to be smoothly rollable. The surface of the roller 16 expected to contact a cam 18, which will be described later, is formed of rubber or synthetic resin, so that the surface does not slip on the cam 18. A tongue 17 extends out from the other side of the lower portion of the film frame 13.

The roller 16 rests on the cam 18, which is rotatable about a vertical axis, due to gravity. The cam 18 is implemented as a bottomed, hollow cylinder having a vertical axis. The cam 18 has a cam surface 19 on its top and has a plurality of radially extending tongues 21 at its lower end. The tongues 21 are positioned at the same level or height, and each corresponds in position to a particular position maintaining portion included in the cam surface 19. A drive motor 22 is mounted on the lower surface of the projector base 11 for causing the cam 18 to rotate clockwise, as viewed in FIG. 5 (direction P shown in FIG. 9A). The drive motor 22 does not have to be a stepping motor, but it may be a DC motor or similar inexpensive motor.

A film frame sensor 23 is positioned on the upper surface of the projector base 11 such that the sensor 23 faces the tongue 17 of the film frame 13 when the frame 13 is moved to its lowermost position. More specifically, when the film frame sensor 23 senses the tongue 17, it is determined that the film frame 13 is positioned at the lowermost position. A cam position sensor 24 is so positioned as to sense the tongues 21, which move due to the rotation of the cam 18.

Lenses 32 and 33 for adjustment are positioned in front of a light source 31 in order to shape light issuing from the light source 31 into parallel rays. A diffusing lens 34 is located in front of the lens 33. The film frame 13 is movable in the up-and-down direction between the lens 33 and the diffusing lens 34, so that the lattice film 14 or the screen 15 selectively enters the optical path between the lenses 33 and 34. The diffusing lens 34 diffuses light output from the lattice film 14 such that the light projects a stripe pattern on the object 0, not shown.

FIG. 7 shows the configuration of the cam 18 in detail. As shown, the cam surface 19 is made up of a screen guide portion 19a, an upward guide portion 19b and a first, a second, a third and a fourth position maintaining portion 19c through 19f that are insensitive portions. The screen guide portion 19a is positioned at the bottom of the cam surface 19 and substantially horizontal. So long as the screen guide portion 19a guides the roller 16, the film frame 13 remains at its lowermost position despite the rotation of the cam 18, causing the screen 15 to block the optical path. When the roller 16 rests on the screen guide portion 19a, the film frame sensor 23 senses the tongue 17.

The upward guide portion 19b extends from the screen guide portion 19a to the first position maintaining portion 19c in the form of a slope along the arc of the cylinder. When the roller 16 rolls on the upward guide portion 19b, the film frame 13 moves upward due to the rotation of the cam 18. The first to fourth position maintaining portions 19c through 19f are horizontal, but different in level from each other. When the roller 16 rolls on each of the position maintaining portions 19c through 19f, the film frame 13 is held at a particular level despite the rotation of the cam 18, positioning the lattice film 14 on the optical path. Nearby ones of the position maintaining portions 19c through 19f are connected by a suitable slant, so that the roller 16 can smoothly move.

Figure 8:
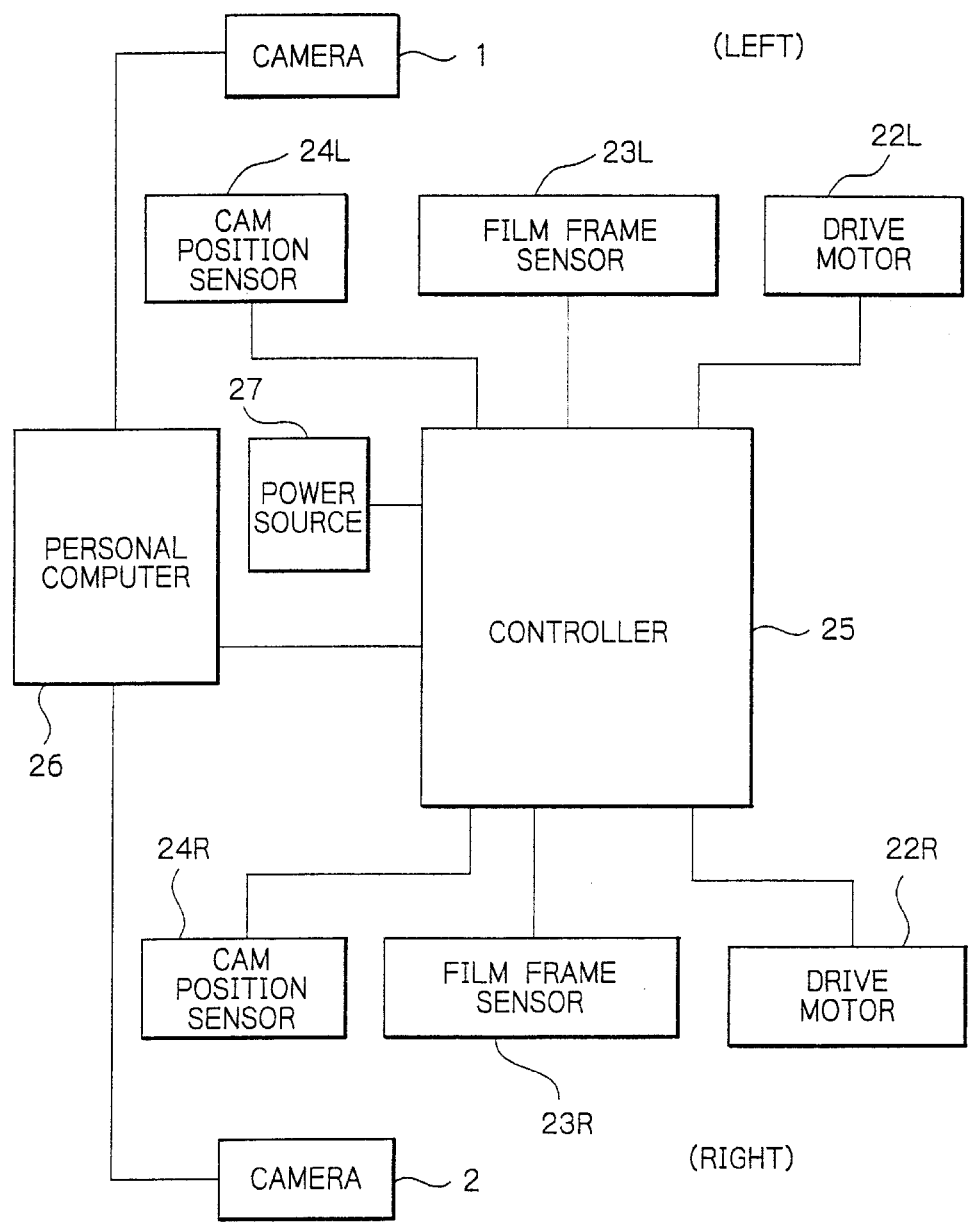
FIG. 8 s schematic block diagram showing a control system included in the illustrative embodiment.

Reference will be made to FIG. 8 for describing a control system for controlling the drive of the camera 1 and the lattice film 14 of the projector 10. As shown, a driveline assigned to the projector 10, which is combined with the left camera 1, is made up of a drive motor 22L, a film frame sensor 23L, and a cam position sensor 24L and connected to a controller 25 by signal lines. Likewise, a driveling assigned to the projection 10, which is combined with the right camera 2, is made up of a drive motor 22R, a film frame sensor 23R, and a cam position sensor 24R and also connected to the controller 25 by signal lines.

The controller 25 feeds a drive signal to each of the drive motors 22L and 22R via the associated signal line in order to energize the drive motor 22L or 22R. The film frame sensors 23L and 23R send their output signals to the controller 25. Likewise, the cam position sensors 24L and 24R send their output signals to the controller 25. The controller 25 sends information representative of the positions of the film frame 14 and derived from the above sensor outputs to a personal computer or similar data processing device 26. Also, an image representative of the object 0 shot by each of the cameras 1 and 2 is input to the data processing device 26. A power source 27 is connected to the controller 25.

The operation of the lattice film driving device will be described with reference to FIGS. 9A through 9D and FIGS. 10 through 13. First, reference will be made to FIG. 10 for describing initialization, which brings each lattice film 14 to its initial position. As shown in FIGS. 6 and 9A, at the initial position of the lattice film 14, the film frame 13 is held at the lowermost position with the screen 15 blocking the optical path between the lens 33 and the diffusing lens 34.

As shown in FIG. 10, when a main switch, not shown, included in the measuring apparatus is turned on, initialization begins (step 700) and causes the power source 27 to start feeding current to the controller 25 (step 701). In response, the controller 25 causes a timer included therein to start counting time and then determines whether or not timer is over (step 702). If the answer of the step 702 is negative (NO), the controller 25 determines whether or not the left film frame sensor 23L responsive to the tongue 17 has turned on (step 703). If the answer of the step 703 is NO, the controller 25 determines that the film frame 13 is not held at the lowermost position. The controller 25 then sends a drive signal to the left drive motor 22L to thereby energize it (step 704) and again monitors the timer (step 702).

The motor 22L driven by the controller 25 causes the cam 18 to rotate and thereby vary the relative position of the cam surface 19 and the roller 16. When the roller 16 is positioned on the screen guide portion 19a, the film frame 13 is located at the lowermost position or initial position with the tongue 17 facing the film frame sensor 23, as shown in FIG. 6. As a result, the film frame sensor 23L turns on, i.e., the answer of the step 703 becomes positive (YES). In response, the controller 25 deenergizes the drive motor 22L (step 705).

This is the end of initialization of the left projector 10. If time expires without the film frame sensor 23L sensing the tongue 17 (NO step 702), meaning that an error has occurred in the driveline, the controller 25 deenergizes the drive motor 22L while producing an alarm (step 706; error processing).

Subsequently, the controller 25 initializes the driveline assigned to the right projector. Specifically, the controller 25 again determines whether or not time is over (step 707). If the answer of the step 707 is NO, the controller 25 determines whether or not the right film frame sensor 23R has sensed the tongue 17 (step 708). The controller 25 then energizes the drive motor 22R until the sensor 23R senses the tongue 17, thereby rotating the cam 18 (step 709). If the answer of the step 708 is YES, the controller 25 stops energizing the drive motor 22R (step 710). This is the end of preparation for a shot for obtaining the three-dimensional data of the object O (step 711). If the answer of the step 708 and that of the step 707 both are NO, meaning that an error has occurred in the driveline, the controller 25 again executes error processing (step 712).

Figure 11:
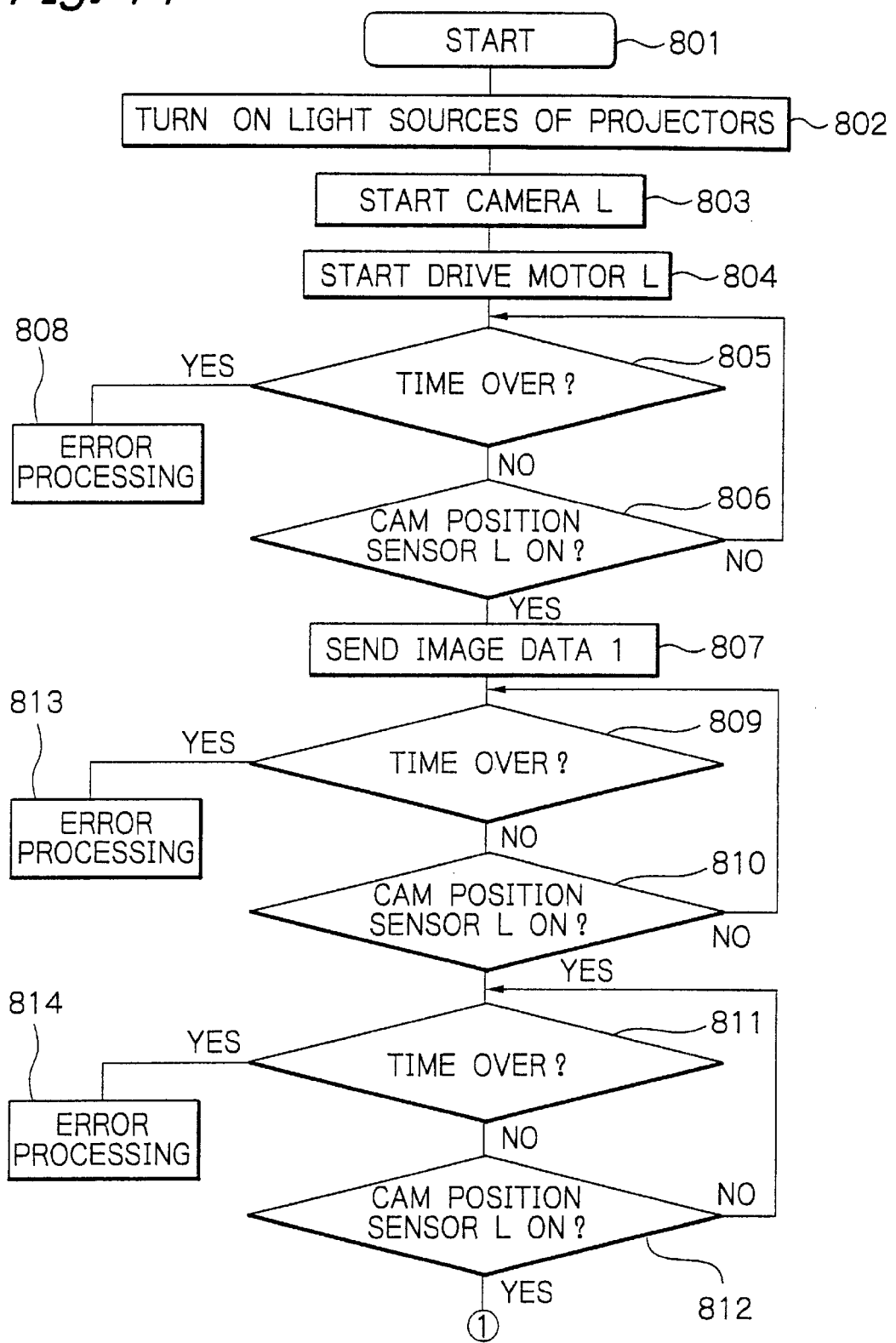
FIG. 11 is a flowchart showing part of a procedure also executed by the control system for obtaining three-dimensional data representative of an object.
Figure 12:
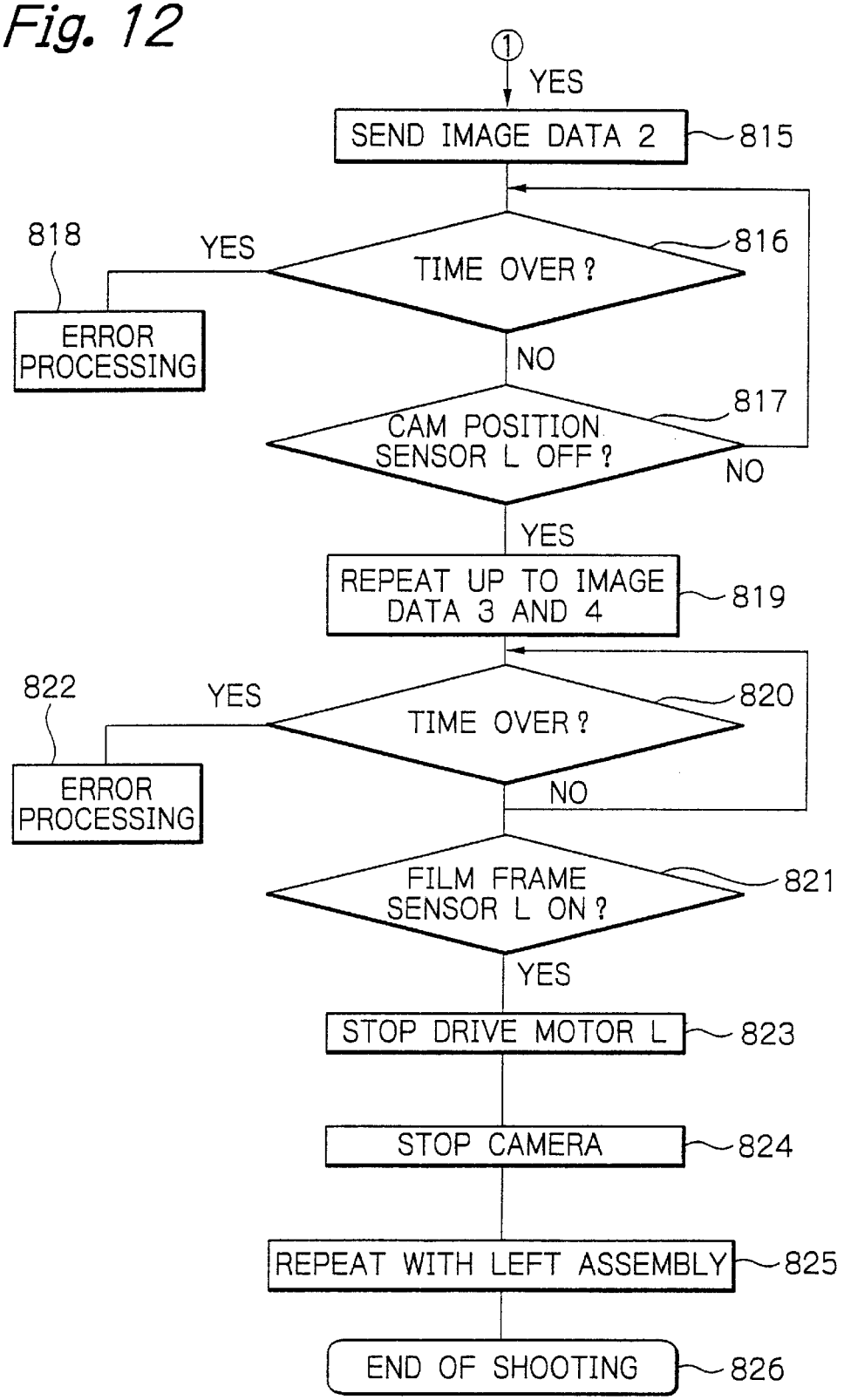
FIG. 12 is a flowchart showing the other part of the same procedure.
Figure 13:
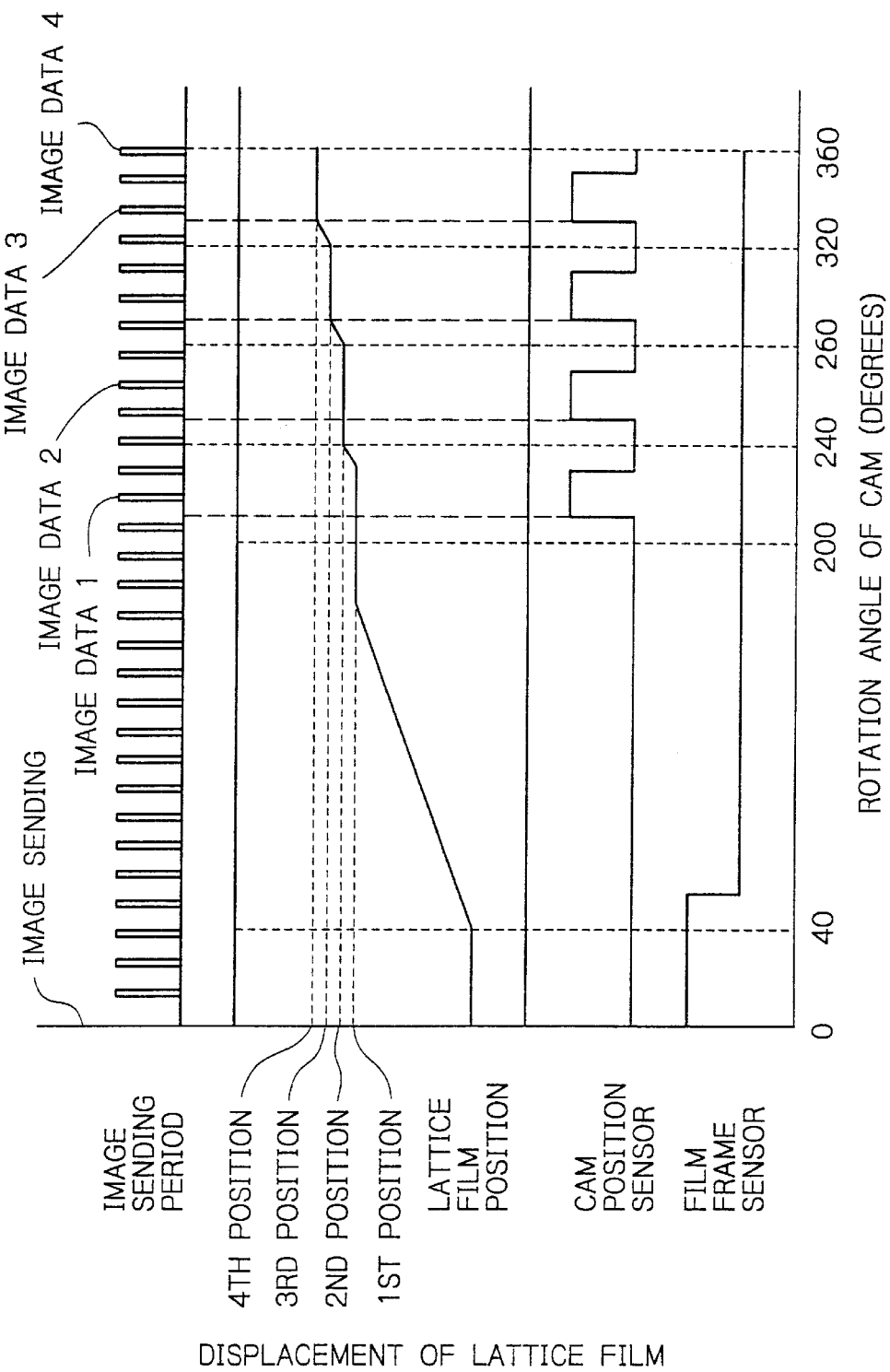
FIG. 13 is a chart showing a relation between the rotation angle of the cam and the positions of various portions included in the illustrative embodiment.

FIGS. 11 and 12 demonstrate actual measurement following the above-described initialization. As shown, on the start of measurement (step 801), the controller 25 turns on the light sources 31 of the right and left projectors 10 (step 802). Assume that the left camera 1 shoots the object O first. Then, the controller 25 drives the left camera 1 in order to start obtaining an image representative of the object O (step 803). As shown in FIG. 13, the camera 1 shoots the object O at preselected intervals.

After the step 803, the controller 25 energizes only the left drive motor 22L and thereby causes the cam 18 to rotate (step 804). The roller 16 rolls on the screen guide portion 19a of the cam surface 19 and then rolls on the upward guide portion 19b contiguous with the screen guide portion 19a. As a result, the roller 16 rises little by little along the upward guide portion 19b, as shown in FIG. 9B. At the same time, the film frame sensor 23 turns off, as shown in FIG. 13. The film frame 13 rises together with the roller 16 with the result that the screen 15 retracts from the optical path while the lattice film 14 enters the optical path. At this instant, as shown in FIG. 13, the cam 18 angularly moves from 40 degrees to 200 degrees.

Meanwhile, the timer of the controller 25 starts counting time. The controller 25 determines whether or not time is over (step 805). If the answer of the step 805 is NO, the controller 25 determines whether or not the cam position sensor 24 has sensed the first tongue 21 (step 806). If the answer of the step 806 is NO, the controller 25 monitors the output of the cam position sensor 24. If the answer of the step 806 is YES, the controller 25 sends a detection signal to the data processing device 26. As a result, an image picked up by the camera 1 then is input to the data processing device 26 as image data 1 corresponding to a fist position of the lattice film 14 (step 807).

More specifically, as shown in FIG. 13, the output signal of the cam position sensor 24 goes high. As shown in FIG. 9C, the roller 16 rolls on the first position maintaining portion 19c of the cam surface 19, maintaining the lattice film 14 at a first position on the optical path between the lens 33 and the diffusing lens 34. In this condition, the camera 10 shoots the object O on which a stripe pattern is projected via the lattice film 14. Moreover, the first position maintaining portion 19c is substantially horizontal and therefore maintains the lattice film 14 at the first position so long as the roller 16 rolls on the portion 19c, insuring sufficient image pickup. For example, as shown in FIG. 13, the lattice film 14 remains at the first position until the cam 18 rotates from an angular position of 200 degrees to an angular position of 240 degrees. This allows the camera 1 to pick up the object O at least twice at its shooting period.

If time expires without the cam position sensor 24 sensing the first tongue 21 (YES, step 805), the controller 25 executes error processing by determining that the rotation of the cam 18 is obstructed due to some error (step 808).

While the drive motor 22 is in rotation, the controller 25 causes the timer to again start counting time and then determines whether or not time is over (step 809). At the same time, the controller 25 determines whether or not the cam position sensor 24 has turned off, i.e., whether or not the first tongue 21 has left the sensor 24 due to the rotation of the cam 18. If the answer of the step 810 is YES, the controller 25 again starts the timer and sees if time is over or not (step 811). At the same time, the controller 25 monitors the output signal of the cam position sensor 24 to see if the second tongue 21 has arrived at the sensor 24 or not (step 812). More specifically, as shown in FIG. 13, the cam position sensor 23 turns off when the roller 16 leaves the first position maintaining portion 19c and again turns on when it rolls on the second maintaining portion 19d.

If time expires without the first tongue 21 leaving the cam position sensor 24 (YES, step 809), the controller 25 executes error processing by determining that an error has occurred in the driveline (step 813). This is also true when time expires without the cam position sensor 24 sensing the second tongue 21 (YES, step 811 and step 814).

Assume that the cam position sensor 24 has sensed the second tongue 21 (YES step 812). Then, the controller 25 sends a detection signal to the data processing device 26 and causes a picture picked up by the camera 1 to be input to the same device 26 as image data 2, which corresponds to a second position of the lattice film 14 (step 815).

More specifically, the roller 16 is handed over from the first position maintaining portion 19c to the second position maintaining portion 19d due to the rotation of the cam 18. As a result, as shown in FIG. 9D, the lattice film 14 is further raised on the optical path to the second position suitably higher than the first position. The stripe pattern projected on the object O via the lattice film 14 at the second position is different in phase and therefore in position from the stripe pattern projected at the first position of the lattice film 14. The camera 1 shoots such a stripe pattern. Moreover, the second position maintaining portion 19d is also substantially horizontal and therefore maintains the lattice film 14 at the second position so long as the roller 16 rolls on the portion 19d, insuring sufficient image pickup. For example, as shown in FIG. 13, the lattice film 14 remains at the second position until the cam 18 rotates from an angular position of 240 degrees to an angular position of 280 degrees. This allows the camera 1 to pick up the object O at least twice at its shooting period.

Subsequently, the controller 25 again determines whether or not time is over (step 816) while monitoring the output signal of the cam position sensor 24 (step 817). If time expires (YES step 816) without the second tongue 21 leaving the cam position sensor 24 (NO, step 817), the controller 25 executes error processing (step 818).

Thereafter, the sequence of steps 811 through 827 is repeated to causes the roller 16 to sequentially roll on the third and fourth position maintaining portions 19e and 19f. As a result, the lattice film 14 is raised from the second position to a third position higher than the second position and then to a fourth position higher than the third position. The stripe patterns projected on the object 0 at the third and fourth positions of the lattice film 14 are different in position from each other. Images picked up by the camera 1 at the third and fourth positions are input to the image processing device 26 as image data 3 and image data 4, respectively (step 819). The third and fourth position maintaining portion 10e and 19f are also substantially horizontal and therefore maintain the lattice film 14 at the third and fourth positions, respectively, so long as the roller 16 rolls on the portions 19e and 19f. For example, as shown in FIG. 13, the lattice film 14 remains at the third position until the cam 18 rotates from an angular position of 280 degrees to an angular position of 320 degrees and then remains at the fourth position until it rotates from the angular position of 320 degrees to an angular position of 360 degrees.

After the step 819, the controller 25 again starts the timer and determines whether or not time is over (step 820). At the same time, the controller 25 determines whether or not the film frame sensor 23 responsive to the lug 17 has turned on (step 821). More specifically, the roller 16 leaves the fourth position maintaining portion 19f due to the rotation of the cam 18 and moves downward to the screen guide portion 19a. As a result, the film frame 13 moves downward until the film frame sensor 23 senses the tongue 17 (YES, step 821). if time expires without the film frame sensor 23 sensing the tongue 17 (YES, step 820), the controller 25 executes error processing (step 822).

If the answer of the step 821 is YES, the controller 25 stops energizing the drive motor 22 (step 823) and stops operating the camera 1 (step 824). During the procedure described so far, the left camera 1 outputs the four different image data 1 through 4 representative of the object 0. At this time, the film frame 13 has been lowered to its initial position, so that the screen 15 again obstructs the optical path extending from the left light source 31. The left light source 31 therefore does not illuminate the object 0.

Subsequently, the controller 25 causes the right camera 2 to output image data 1 through 4 in the same manner as the left camera (step S825). These image data are also input to the image processing device 26. Specifically, while the roller 16 sequentially rolls on the first to fourth position maintaining portions 19a through 19f of the cam surface 19, the right camera 2 outputs the image data 1 through 4. The controller 25 then ends the shooting operation (step 826). This is the end of measurement of the object 0.

The data processing device 26 executes suitable operation with the image data 1 through 4 output from the left camera 1 and the image data 1 through 4 output from the right camera 2, i.e., eight different image data in total, thereby producing three-dimensional data relating to the object 0.

The illustrative embodiment has concentrated on a device for driving a lattice film included in a three-dimensional measuring apparatus. The present invention is similarly applicable to a device for driving, e.g., a color filter that should be sequentially shifted to consecutive positions. The cam surface 19 formed on the top of a cylinder may, of course, be replaced with a cam surface formed on the circumference of a disk.

In summary, it will be seen that the present invention provides a light transmitting member driving device for a contour measuring apparatus having various unprecedented advantages, as enumerated below.

(1) So long as cam follower means contacts an insensitive portion included in a cam surface, a light transmitting member including the cam follower means remains in a halt, allowing preselected operation to be performed. The size of the insensitive portion and therefore the duration of a stop is variable, so that a necessary period of time can be easily adjusted.

(2) While a cam for driving the light transmitting member is in rotation, a screen enters and blocks an optical path. Therefore, an exclusive drive motor for driving a shutter or similar screen and parts associated therewith are not necessary. That is, a driveline for the light transmitting member and screen is simplified.

(3) The cam follower means is implemented as a positive motion cam resting on the cam due to gravity, so that the light transmitting member can be surely driven by a simple configuration.

(4) While the cam follower member rests on the insensitive portion of the cam surface, a lattice film remains in a halt and al lows a desired object to be sufficiently shot. Therefore, if the cam surface includes a plurality of insensitive portions, it is possible to repeatedly shoot the object by sequentially shifting the lattice film. In addition, the cam follower member contacting the cam surface allows a simple structure to surely locate the lattice film at a preselected position and to accurately move the lattice film by a preselected amount.

(5) The screen blocks the optical path, which extends from a light source, in accordance with the rotation of the cam, obviating the need for an exclusive drive motor otherwise assigned to the screen. Further, the screen blocks the optical path while the light source is turned on. This successfully maintains the light source in a stable emitting state and thereby makes it needless for the light source to wait until stabilization. Consequently, rapid measurement of the object is promoted.

(6) The cam surface is implemented by a positive motion cam on which the cam follower means rests due to gravity. A simple structure therefore suffices for causing the cam follower means to surely follow the cam surface and therefore for surely moving the lattice film and screen by a preselected amount.

Various modifications will become possible for those skilled in the art after receiving the teachings of the present disclosure without departing from the scope thereof.

What is claimed is:

1. A contour measuring apparatus for outputting data relating to a contour of an object, comprising:
   a light source;
   a light transmitting member through which light issuing from a light source is incident to an object to be measured; and
   a driving device for moving said light transmitting member by a preselected amount in a preselected direction while the light issuing from said light source is incident to the object via said light transmitting member;
   said driving device comprising:
      cam follower means included in said light transmitting member; and
      a cam for guiding said cam follower means;
      wherein said cam has a cam surface including a plurality of contiguous, insensitive portions each for causing said light transmitting member to remain in a halt at a particular position when said cam follower means contacts the insensitive portion.

2. The apparatus as claimed in claim 1, wherein said light transmitting member is movable in a vertical direction,
   said cam comprises a hollow cylinder having a vertically extending axis and a cam surface formed on a top of said hollow cylinder, said cam follower means contacting said cam surface due to gravity, and drive means is connected to a bottom of the hollow cylinder to thereby cause said cam to rotate about the axis.

3. The apparatus as claimed in claim 1, wherein said light transmitting member includes a screen portion for obstructing, when said cam follower means contacts part of said cam surface, an optical path extending from said light source.

4. The apparatus as claimed in claim 3, wherein said light transmitting member is movable in a vertical direction, said cam comprises a hollow cylinder having a vertically extending axis and a cam surface formed on a top of said hollow cylinder, said cam follower means contacting said cam surface due to gravity, and drive means is connected to a bottom of the hollow cylinder to thereby cause said cam to rotate about the axis.

5. A three-dimensional measuring apparatus comprising:

a projector for emitting light;

a lattice film through which the light issuing from said projector is transmitted to illuminate an object to be measured, said lattice film being movable to a plurality of projecting positions in a preselected direction; and a camera for shooting the object on which the light is projected; and a driving device for driving said lattice film;

said driving device comprising:

cam follower means associated with said lattice film; and a cam for guiding said cam follower means;

wherein said cam has a cam surface including a plurality of contiguous, insensitive portions each for causing said lattice film to remain in a halt at a particular position when said cam follower means contacts the insensitive portion.

6. The apparatus as claimed in claim 5, wherein said lattice film is movable in a vertical direction, said cam comprises a hollow cylinder having a vertically extending axis and a cam surface formed on a top of said hollow cylinder, said cam follower means contacting said cam surface due to gravity, and drive means is connected to a bottom of the hollow cylinder to thereby cause said cam to rotate about the axis.

7. The apparatus as claimed in claim 5, wherein said lattice film is contiguous with a screen portion for obstructing, when said cam follower means contacts part of said cam surface, an optical path extending from a light source included in said projector.

8. The apparatus as claimed in claim 7, wherein said lattice film is movable in a vertical direction, said cam comprises a hollow cylinder having a vertically extending axis and a cam surface formed on a top of said hollow cylinder, said cam follower means contacting said cam surface due to gravity, and drive means is connected to a bottom of the hollow cylinder to thereby cause said cam to rotate about the axis.

\* \* \* \* \*